(12) United States Patent
Feng et al.

(10) Patent No.: US 12,574,882 B2
(45) Date of Patent: Mar. 10, 2026

(54) WIRELESS RANGING WITH BW320 BASED ON EHT FORMAT

(71) Applicant: MEDIATEK INC., Taiwan (CN)

(72) Inventors: Shuling Feng, San Jose, CA (US);
Jianhan Liu, San Jose, CA (US);
Thomas Edward Pare, Jr., San Jose, CA (US)

(73) Assignee: MEDIATEK INC. (TW)

( * ) Notice: Subject to any disclaimer, the term of this patent is extended or adjusted under 35 U.S.C. 154(b) by 230 days.

(21) Appl. No.: 18/210,549

(22) Filed: Jun. 15, 2023

(65) Prior Publication Data

US 2024/0049157 A1 Feb. 8, 2024

Related U.S. Application Data

(60) Provisional application No. 63/370,130, filed on Aug. 2, 2022.

(51) Int. Cl.
*H04W 56/00* (2009.01)
*H04W 84/12* (2009.01)

(52) U.S. Cl.
CPC ........ *H04W 56/0065* (2013.01); *H04W 84/12* (2013.01)

(58) Field of Classification Search
CPC ............. H04W 72/1268; H04W 84/12; H04W 56/0065; H04L 1/0003; H04L 27/2602;
(Continued)

(56) References Cited

U.S. PATENT DOCUMENTS 11,817,984 B2 * 11/2023 Chun ................... H04L 27/2613
11,949,609 B2 * 4/2024 Liu ..................... H04L 27/2602
(Continued)

OTHER PUBLICATIONS 802 11 Working Group of the LAN/MAN Standards Committee of the IEEE Computer Society: "Draft Standard for Information technology—Tele-communications and information exchange between systems Local and metropolitan area networks—Specific requirements?? Part 11: Wireless LAN Medium Access Control? (MAC) and Physical Layer (PHY) Specifications?? Amendment 8: Enhancements for extre", IEEE Draft; Draft P802.11BE_D1.4_REDLINE_COMPARED_TO_DI.0, IEEE-SA, Piscataway, NJ USA vol.
(Continued)

*Primary Examiner* — Mahran Y Abu Roumi

(57) ABSTRACT

Embodiments of the present invention are drawn to systems, apparatus and methods that perform wireless ranging procedures using EHT frames supporting large bandwidth transmission. Moreover, ranging specifications are expanded for the EHT frame format in order to support BW320 ranging with improved performance and accuracy. Embodiments of the present invention support high-bandwidth BW320 and BW240 wireless ranging using a EHT frame format and support 802.11az ranging using a high efficiency (HE) for 802.11be devices. Long training field (LTF) repetition features and security features are also described for EHT-LTFs, and signaling of preamble puncturing patterns are defined for 320 MHz physical layer protocol data units (PPDUs) carried in the U-SIG field and in Trigger Frames to improve spectrum efficiency and reduce interference, according to embodiments.

20 Claims, 17 Drawing Sheets

100

| BW320-1 / BW320-2 | 80 | 80 | 80 | 80 | 105 |

| BW240 - | 80 | 80 | 80 | 110 |

| BW240 - | 80 | 80 | 80 | 115 |

(58) Field of Classification Search
CPC . H04L 5/0048; H04L 27/26132; G01S 13/79;
G01S 7/006; H04B 7/0452
See application file for complete search history.

(56) References Cited

U.S. PATENT DOCUMENTS

| | | | |
|---|---|---|---|
| 2021/0385115 A1* | 12/2021 | Cao ......................... | H04L 69/08 |
| 2023/0137148 A1* | 5/2023 | Chun ................... | H04W 84/12 |
| | | | 370/338 |
| 2023/0209539 A1* | 6/2023 | Yu ..................... | H04W 72/1268 |
| | | | 370/329 |
| 2023/0337025 A1* | 10/2023 | Sun ......................... | G01S 13/79 |
| 2024/0306202 A1* | 9/2024 | Lim ..................... | H04L 5/0044 |

OTHER PUBLICATIONS 802 11 Working Group of LAN/WAN Standard Committee of the IEEE:IEEE Draft; Draft P802.11AZ_D4.I_REDLINE_COMPARED_TO_D4.0, IEEE-SA, Piscataway, NJ USA vol. 802.llaz drafts, No. D4.17 Feb. 2022 (Feb. 7, 2022), pp. 1 288, ?CP068191581, Retrieved from the Internet: URL:https://www.ieee802.org/11/private/Draft_Standards/llaz/Draft%20P802.llaz_D4.I_r edline_compared_to_D4.0.pdf.

* cited by examiner

200

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | Ranging |
| 9-15 | Reserved |

| Ranging Trigger Subtype subfield value | Ranging Trigger frame subvariant |
|---|---|
| 0 | Poll |
| 1 | Sounding |
| 2 | Secure Sounding |
| 3 | Report |
| 4 | Passive Sounding (#2284, #5006, #5235) |
| 5-15 | Reserved |

305

400

| B0   B11 | B12   B19 | B20 | B21 B24 | B25 | B26   B31 | B32   B38 | B39 | |
|---|---|---|---|---|---|---|---|---|
| AID12 | RU Allocation | UL FEC Coding Type | UL EHT-MCS | Reser ved | SS Allocation/ RA-RU Information | UL Target Receive Power | PS160 | Trigger Dependent User Info |
| 12 | 8 | 1 | 4 | 1 | 6 | 7 | 1 | variable |

Bits:

405

410

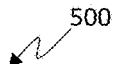
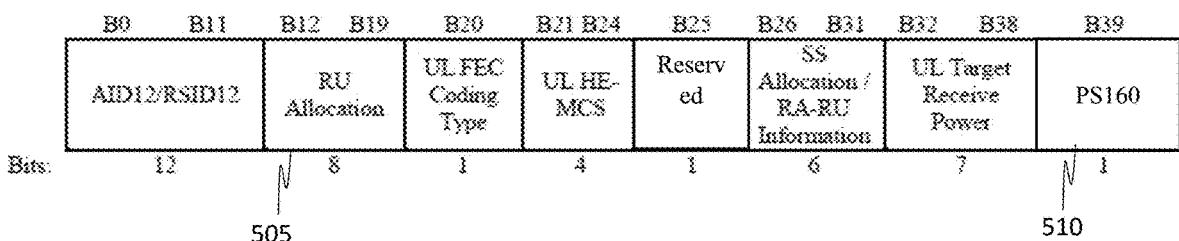
| B0          B11 | B12    B19 | B20 | B21 B24 | B25 | B26    B31 | B32    B38 | B39 |
|---|---|---|---|---|---|---|---|
| AID12/RSID12 | RU Allocation | UL FEC Coding Type | UL HE-MCS | Reserved | SS Allocation / RA-RU Information | UL Target Receive Power | PS160 |
| Bits:       12 | 8 | 1 | 4 | 1 | 6 | 7 | 1 |
505                                                                       510
FIG. 5

600

| B0          B11 | B12  B20 | B21  B23 | B24  B25 | B26          B31 | B32  B38 | B39 |
|---|---|---|---|---|---|---|
| AID12/RSID12 | RU Allocation | 12R Rep | Reserved | SS Allocation / RA-RU Information | UL Target Receive Power | PS160 |
| Bits:     12 | 9 | 3 | 2 | 6 | 7 | 1 |

605

610

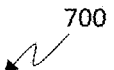
700
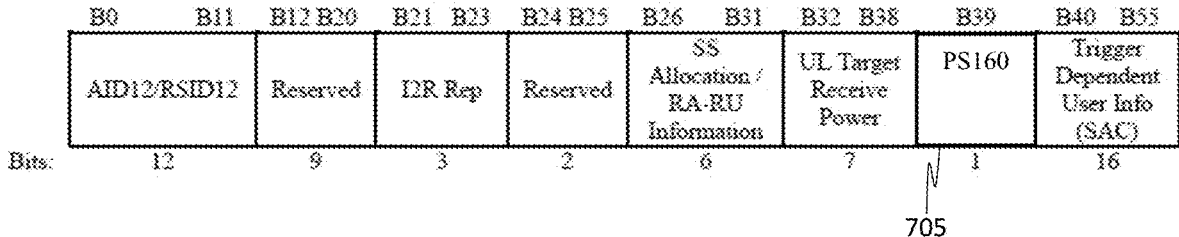
| B0 | B11 | B12 | B20 | B21 | B23 | B24 | B25 | B26 | B31 | B32 | B38 | B39 | B40 | B55 |
|---|---|---|---|---|---|---|---|---|---|---|---|---|---|---|
| AID12/RSID12 | | Reserved | | I2R Rep | | Reserved | | SS Allocation / RA-RU Information | | UL Target Receive Power | | PS160 | Trigger Dependent User Info (SAC) | |
| Bits: 12 | | 9 | | 3 | | 2 | | 6 | | 7 | | 1 | 16 | |
705
FIG. 7

900

| Field value | Format | Bandwidth |
|---|---|---|
| 0 | HE | 20 |
| 1 | HE | 40 |
| 2 | HE | 80 |
| 3 | HE | 80+80 |
| 4 | HE (two separate RF Los) | 160 |
| 5 | HE (single RF LO) | 160 |
| 6-16 | EHT | 320/240 |
| 17-63 | Reserved | Reserved |

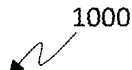

| Two parts of U-SIG | Bit | Field | Number of bits | Description |
|---|---|---|---|---|
| U-SIG-1<br><br>1005 | B0-B2 | PHY Version Identifier | 3 | Differentiate between different PHY classes.<br>Set to 0 for EHT.<br>Values 1~7 are Validate. |
| 1010 | B3-B5 | Bandwidth | 3 | Set to 0 for 20 MHz.<br>Set to 1 for 40 MHz.<br>Set to 2 for 80 MHz.<br>Set to 3 for 160 MHz.<br>Set to 4 for 320 MHz-1.<br>Set to 5 for 320 MHz-2.<br>See definition of 320 MHz-1 and 320 MHz-2 in 36.3.23.2 (Channelization for 320 MHz channel(#1577).<br>Values 6 and 7 are Validate. |

| PPDU bandwidth | Cases | Puncturing pattern (RU or MRU Index) | Field value | |
|---|---|---|---|---|
| 1105 | No puncturing | {1 1 1 1 1 1 1 1} (4×996-tone RU 1) | 0 | BW320 |
| 1110 | 80 MHz puncturing | {x x 1 1 1 1 1 1} (3×996-tone MRU 1) | 9 | BW240-1 |
| | | {1 1 x x 1 1 1 1} (3×996-tone MRU 2) | 10 | |
| | | {1 1 1 1 x x 1 1} (3×996-tone MRU 3) | 11 | |
| 1115 | | {1 1 1 1 1 1 x x} (3×996-tone MRU 4) | 12 | BW240-2 |

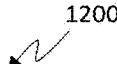

1200

| Two parts of U-SIG | Bit | Field | Number of bits | Description |
|---|---|---|---|---|
| U-SIG-1 1205 | B0~B2 | PHY Version Identifier(#1022) | 3 | (#1123)Differentiate between different PHY clauses.<br>Set to 0 for EHT.<br>Values 1~7 are Validate(#1113) |
| 1210 | B3~B5 | Bandwidth(#1642) | 3 | Set to 0 for 20 MHz.<br>Set to 1 for 40 MHz.<br>Set to 2 for 80 MHz.<br>Set to 3 for 160 MHz.<br>Set to 4 for 320 MHz-1.<br>Set to 5 for 320 MHz-2.<br>See definition of 320 MHz-1 and 320 MHz-2 in 36.3.23.2 (Channelization for 320 MHz channel(#1577)(#1113).<br>Values 6 and 7 are Validate(#1026#1113#1144). |

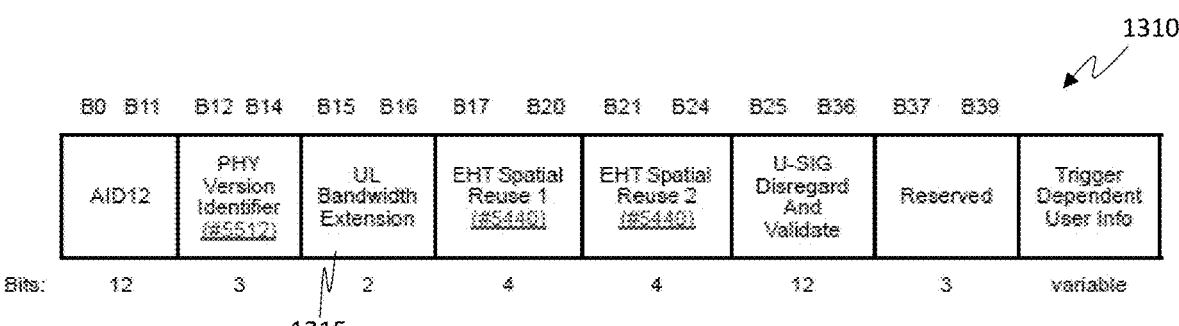

| B0  B11 | B12 B14 | B15  B16 | B17  B20 | B21  B24 | B25  B36 | B37  B39 | |
|---|---|---|---|---|---|---|---|
| AID12 | PHY Version Identifier (#5512) | UL Bandwidth Extension | EHT Spatial Reuse 1 (#5440) | EHT Spatial Reuse 2 (#5440) | U-SIG Disregard And Validate | Reserved | Trigger Dependent User Info |
| Bits:  12 | 3 | 2 | 4 | 4 | 12 | 3 | variable |

1315

Table 9-53c—UL Bandwidth Extension subfield encoding

1305

| UL BW | Bandwidth for HE TB PPDU (MHz) | UL Bandwidth Extension | Bandwidth for EHT TB PPDU (MHz) |
|---|---|---|---|
| 0 | 20 | 0 | 20 |
| 0 | 20 | 1 | Reserved |
| 0 | 20 | 2 | Reserved |
| 0 | 20 | 3 | Reserved |
| 1 | 40 | 0 | 40 |
| 1 | 40 | 1 | Reserved |
| 1 | 40 | 2 | Reserved |
| 1 | 40 | 3 | Reserved |
| 2 | 80 | 0 | 80 |
| 2 | 80 | 1 | Reserved |
| 2 | 80 | 2 | Reserved |
| 2 | 80 | 3 | Reserved |
| 3 | 160 | 0 | Reserved |
| 3 | 160 | 1 | 160 |
| 3 | 160 | 2 | 320-1 |
| 3 | 160 | 3 | 320-2 |

| PPDU bandwidth | Cases | Puncturing pattern (RU or MRU Index) | Field value |
|---|---|---|---|
| 320 MHz | No puncturing | [1 1 1 1 1 1 1 1] (4×996-tone RU 1) | 0 |
| | 40 MHz puncturing | [x 1 1 1 1 1 1 1] (3×996+484-tone MRU 1) | 1 |
| | | [1 x 1 1 1 1 1 1] (3×996+484-tone MRU 2) | 2 |
| | | [1 1 x 1 1 1 1 1] (3×996+484-tone MRU 3) | 3 |
| | | [1 1 1 x 1 1 1 1] (3×996+484-tone MRU 4) | 4 |
| | | [1 1 1 1 x 1 1 1] (3×996+484-tone MRU 5) | 5 |
| | | [1 1 1 1 1 x 1 1] (3×996+484-tone MRU 6) | 6 |
| | | [1 1 1 1 1 1 x 1] (3×996+484-tone MRU 7) | 7 |
| | | [1 1 1 1 1 1 1 x] (3×996+484-tone MRU 8) | 8 |
| | 80 MHz puncturing | [x x 1 1 1 1 1 1] (3×996-tone MRU 1) | 9 |
| | | [1 1 x x 1 1 1 1] (3×996-tone MRU 2) | 10 |
| | | [1 1 1 1 x x 1 1] (3×996-tone MRU 3) | 11 |
| | | [1 1 1 1 1 1 x x] (3×996-tone MRU 4) | 12 |

...

Figure 14B:
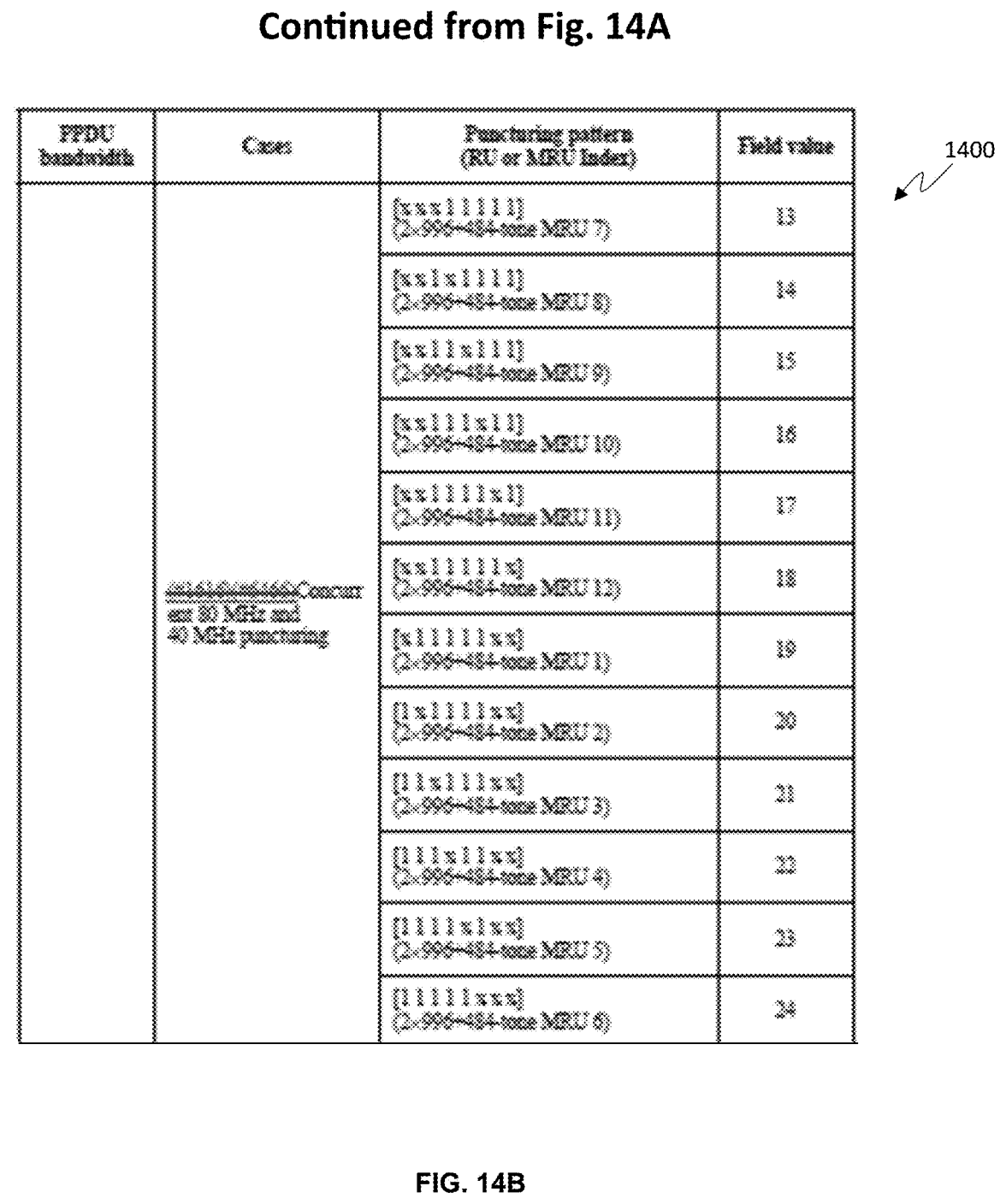

Continued from Fig. 14A

1400

| PPDU bandwidth | Cases | Puncturing pattern (RU or MRU index) | Field value |
|---|---|---|---|
| | | [x x 1 1 1 1] (2-996+484-tone MRU 7) | 13 |
| | | [x 1 x 1 1 1] (2-996+484-tone MRU 8) | 14 |
| | | [x 1 1 x 1 1] (2-996+484-tone MRU 9) | 15 |
| | | [x 1 1 1 x 1] (2-996+484-tone MRU 10) | 16 |
| | | [x 1 1 1 1 x] (2-996+484-tone MRU 11) | 17 |
| | Concurrent 80 MHz and 40 MHz puncturing | [x 1 1 1 1 1 x] (2-996+484-tone MRU 12) | 18 |
| | | [x 1 1 1 1 x x] (2-996+484-tone MRU 1) | 19 |
| | | [1 x 1 1 1 x x] (2-996+484-tone MRU 2) | 20 |
| | | [1 1 x 1 1 x x] (2-996+484-tone MRU 3) | 21 |
| | | [1 1 1 x 1 1 x x] (2-996+484-tone MRU 4) | 22 |
| | | [1 1 1 1 x 1 x x] (2-996+484-tone MRU 5) | 23 |
| | | [1 1 1 1 1 x x x] (2-996+484-tone MRU 6) | 24 |

Transmitting an IFTMR frame comprising a value indicating high-bandwidth ranging

1605

Receiving an IFTM frame comprising a value indicating high-bandwidth ranging responsive to the IFTMR frame

1610

Transmitting an NDP in the EHT frame format (EHT Ranging NDP or an EHT TB Ranging NDP) using a 320 MHz PPDU

1615

Receiving a ranging report frame

1620

WIRELESS RANGING WITH BW320 BASED ON EHT FORMAT

CROSS-REFERENCE TO RELATED APPLICATIONS

This application claims the benefit of and priority to provisional patent application Ser. No. 63/370,130, with filing date Aug. 2, 2022, which is hereby incorporated by reference in its entirety.

FIELD

Embodiments of the present invention generally relate to the field of wireless communications. More specifically, embodiments of the present invention relate to systems and methods of performing wireless ranging.

BACKGROUND

Modern electronic devices typically send and receive data with other electronic devices wirelessly using Wi-Fi, and many new wireless devices (e.g., IEEE 802.11 be) utilize the extremely high throughput (EHT) frame format to communicate using relatively wide bandwidths (e.g., 320 MHz, or "BW320"). A wireless ranging procedure is typically performed to determine and/or coordinate communication timing which includes transferring series of frames between a wireless access point (AP) and a wireless station (STA) and recording the departure time and the reception time to determine the distance/timing between the AP and the STA. However, many existing wireless ranging procedures (e.g., IEEE 802.11 az) are limited to a 160 MHz maximum ranging bandwidth. An expanded EHT ranging approach for larger bandwidths (e.g., 320 MHz) is desired.

SUMMARY

Accordingly, what is needed is an approach to wireless ranging that can expand the existing EHT frame format to support ranging using larger bandwidths (e.g., BW320 or BW240). Embodiments of the present invention are drawn to systems, apparatus and methods that perform wireless ranging procedures using EHT frames supporting large bandwidth transmission. Moreover, ranging specifications are expanded for the EHT frame format in order to support BW320 ranging with improved performance and accuracy. Embodiments of the present invention support high-bandwidth, e.g. BW320 or BW240, wireless ranging for 802.11be devices. Long training field (LTF) repetition features and security features are also described for EHT-LTFs, and signal preamble puncturing patterns are defined for 320 MHz physical layer protocol data units (PPDUs) carried in the U-SIG field and in Trigger Frames to improve spectrum efficiency and reduce interference, according to embodiments.

According to one disclosed embodiment, a method of extremely high throughput (EHT) wireless ranging using a 320 MHz physical layer protocol data unit (PPDU) is disclosed. The method includes transmitting an initial fine timing measurement request (IFTMR) frame including a value indicating high-bandwidth ranging for receipt by a wireless device, receiving an initial fine timing measurement (IFTM) frame from the wireless device responsive to the IFTMR frame, the IFTM frame including another value indicating high-bandwidth ranging, and performing a high-bandwidth wireless ranging procedure including transmitting a null data packet (NDP) in the EHT frame format using a 320 MHz PPDU for receipt by the wireless device, the NDP including at least one of a ranging NDP and a trigger-based (TB) ranging NDP, and receiving a ranging report frame from the wireless device.

According to some embodiments, the 320 MHz PPDU includes a continuous 320 MHz bandwidth.

According to some embodiments, the 320 MHz PPDU includes a 240 MHz bandwidth, and a first 80 MHz portion of the 320 MHz PPDU or a last 80 MHz portion of the 320 MHz PPDU is punctured.

According to some embodiments, the 320 MHz PPDU includes a 240 MHz bandwidth, and a last 80 MHz portion of the 320 MHz PPDU is punctured.

According to some embodiments, the method further includes transmitting a trigger frame (TF) including an EHT variant Common Info field, and the EHT variant Common Info field includes a Ranging Trigger subtype set to a value indicating a ranging procedure to the wireless device.

According to some embodiments, the NDP includes a U-SIG field operable to signal supported preamble puncturing patterns.

According to some embodiments, the performing a high-bandwidth wireless ranging procedure further includes generating a random long training field (LTF) sequence in an EHT BW320 format.

According to some embodiments, the performing a high-bandwidth wireless ranging procedure further includes constructing a secure EHT-long training field (LTF) in an EHT BW320 format.

According to some embodiments, the performing a high-bandwidth wireless ranging procedure further includes applying pseudorandom and deterministic phase rotations for secure EHT-LTF to spatial streams in an EHT BW320 format.

According to some embodiments, the performing a high-bandwidth wireless ranging procedure further includes parsing a data stream using a segment parser coupled to four 64QAM modulators, and each of the four 64QAM modulators are operable to receive pseudorandom octets of the data stream from the segment parser for an 80 MHz portion of a 320 MHz bandwidth in a round robin fashion.

According to some embodiments, the NDP includes a U-SIG field operable to signal supported preamble puncturing patterns, and the IFTM frame and the IFTMR frame include a Format and Bandwidth subfield including a value indicating wireless ranging using EHT BW320

According to some embodiments, the IFTM frame and the IFTMR frame include a Format and Bandwidth subfield including a value indicating wireless ranging using at least one of: EHT BW240, and EHT BW 320.

According to some embodiments, a value of '6' in the Format and Bandwidth subfield indicates wireless ranging using EHT BW240, and a value of '7' in the Format and Bandwidth subfield indicates wireless ranging using EHT BW320.

According to some embodiments, the method includes receiving a beacon frame including a plurality of preamble puncturing patterns, and the transmitting the NDP using a 320 MHz PPDU for receipt by a wireless device includes puncturing a portion of the 320 MHz PPDU according to one of the plurality of preamble puncturing patterns.

According to some embodiments, the plurality of preamble puncturing patterns include:
  a. mandatory preamble puncture patterns that are supported for performing wireless ranging, and b. optional preamble puncture patterns that are optionally supported for performing wireless ranging.

According to another embodiment, an apparatus for wireless ranging using an extremely high throughput (EHT) 320 MHz PPDU is disclosed. The apparatus includes a processor, a memory coupled to the processor and operable to store data, and a radio under control of said processor and operable to perform wireless ranging. The processor is operable to cause the radio to transmit an Initial Fine Timing Measurement Request (IFTMR) frame including a value indicating high-bandwidth ranging for receipt by a wireless device, receive an Initial Fine Timing Measurement (IFTM) frame from the wireless device responsive to the IFTMR frame. The IFTM frame including another value indicating high-bandwidth ranging, transmit a null data packet (NDP) in the EHT frame format using a 320 MHz PPDU for receipt by the wireless device, and receive a ranging report frame from the wireless device.

According to some embodiments, the processor is further operable to cause the radio to transmit a trigger frame (TF) including an EHT variant Common Info field.

According to some embodiments, the EHT variant Common Info field includes a Ranging Trigger subtype set to a value indicating a ranging procedure to the wireless device.

According to a different embodiment, a non-transitory computer-readable storage medium is disclosed having embedded therein program instructions, which when executed by one or more processors of a device, causes the device to execute a method for wireless ranging using an extremely high throughput (EHT) 320 MHz PPDU. The method includes transmitting an initial fine timing measurement request (IFTMR) frame including a value indicating high-bandwidth ranging for receipt by a wireless device, receiving an initial fine timing measurement (IFTM) frame from the wireless device responsive to the IFTMR frame, the IFTM frame including another value indicating high-bandwidth ranging, transmitting a null data packet (NDP) in the EHT frame format using a 320 MHz PPDU for receipt by the wireless device, the NDP including at least one of: a ranging NDP, and a trigger-based (TB) ranging NDP, and receiving a ranging report frame from the wireless device.

According to some embodiments, the method further includes transmitting a trigger frame (TF) including an EHT variant Common Info field, and the EHT variant Common Info field includes a Ranging Trigger subtype set to a value indicating a ranging procedure to the wireless device.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2 is a table depicting an exemplary Trigger Type subfield encoding of a Common Info Field carried in a trigger frame for performing wireless ranging according to embodiments of the present invention.

FIG. 5 depicts a Poll and Report EHT subvariant of a User Info Field according to embodiments of the present invention.

FIG. 7 depicts an exemplary Secure Sounding EHT subvariant of a User Info Field according to embodiments of the present invention.

FIG. 9 is a table depicting fields and values of an exemplary Format and Bandwidth subfield carried in a Ranging Parameters field of an Initial Fine Timing Measurement frame according to embodiments of the present invention.

FIG. 10 is a table depicting exemplary fields and values of a U-SIG field for an EHT NDPA frame or a Ranging NDP frame according to embodiments of the present invention.

FIG. 12 is a table depicting fields and values of an exemplary U-SIG field of an EHT TB PPDU according to embodiments of the present invention.

FIG. 13 depicts an exemplary UL bandwidth extension subfield encoding in a Special User Info field of an EHT TB PPDU according to embodiments of the present invention.

FIG. 14B is a table continuing to depict the exemplary RU/MRU index depicted in FIG. 14A according to embodiments of the present invention.

DETAILED DESCRIPTION

Figure 1:
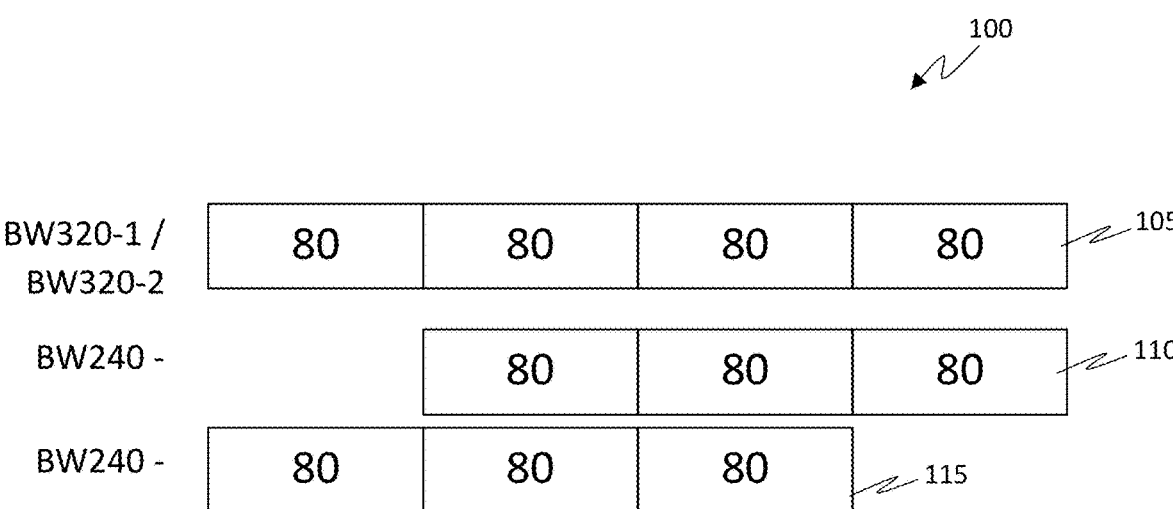
FIG. 1 is a block frequency diagram depicting exemplary wireless bandwidths for wireless ranging using high-bandwidth transmission according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIG. 16) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Wireless Ranging Procedures for BW240/BW320 in a Wireless Network

Embodiments of the present invention are drawn to systems, apparatus and methods that perform wireless ranging procedures using EHT frames supporting large bandwidth transmission. Moreover, ranging specifications are expanded for the EHT frame format in order to support BW320 ranging with improved performance and accuracy. Embodiments of the present invention support high-bandwidth BW320 and BW240 wireless ranging for 802.11be devices, and support 802.11az ranging using a high efficiency (HE) or EHT frame format. Long training field (LTF) repetition features and security features are also described for EHT-LTFs, and signal preamble puncturing patterns are defined for 320 MHz physical layer protocol data units (PPDUs) carried in the U-SIG field and in Trigger Frames to improve spectrum efficiency and reduce interference, according to embodiments.

Preamble puncturing may be used to support ranging using larger bandwidths by removing portions of a larger available bandwidth (e.g., 320 MHz) for use as a smaller bandwidth portion (e.g., a 280, 240, or 200 MHz bandwidth), which can help avoid interference with other devices. While the IEEE 802.11az frame format does not support preamble puncturing, IEEE 1 802.11be can signal preamble puncturing patterns for EHT in the U-SIG field and in Trigger Frames to support larger bandwidths according to embodiments of the present invention. According to other embodiments, PPDUS of a continuous 320 MHz bandwidth are used. Some embodiments utilize preamble puncturing on a limited basis to support 240 MHz ranging transmissions by puncturing the first or last 80 MHz frequency portion, for example, while others may employ other preamble puncture patterns defined in a lookup table.

Figure 14A:
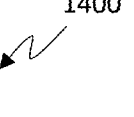
FIG. 14A is a table depicting an exemplary RU/MRU index for a 320 MHz PPDU using 40 MHz, 80 MHz, and concurrent 80 MHz and 40 MHz puncturing according to embodiments of the present invention.

Some exemplary preamble puncturing patterns are depicted in FIGS. 14A and 14B according to embodiments of the present invention and can include values in Table 36-30 of the IEEE 802.11be D3.0 specification. Some of the preamble puncture patterns can be considered mandatory, while other patterns (such as those depicted in FIGS. 14A and 14B) are optionally supported. For example, according to some embodiments, support for a continuous bandwidth of 320 MHz and some other limited puncturing patterns is mandatory (e.g., puncturing patterns with field value 0, 1, 8, 9, 12, 13, 18, 19, and 24 of Table 36-30), and the other preamble puncturing patterns of Table 36-30 are optionally supported.

FIG. 1 depicts exemplary wireless bandwidths 100 for wireless ranging using high-bandwidth transmission according to embodiments of the present invention. The 320 MHz bandwidth operation (BW320) uses continuous frequency segment 105. Limited pattern puncturing can be employed to support 240 MHz bandwidths BW240-1 (110) and BW240-2 (115), where either the first or the last 80 MHz portion is punctured (not used). Wireless ranging with EHT frames can be performed using one of the bandwidth configurations pictured in FIG. 1, for example. By supporting larger bandwidths, the accuracy and performance of wireless ranging is improved.

FIG. 2 depicts exemplary Trigger Type subfield encoding 200 of a Common Info Field carried in a trigger frame for performing wireless ranging according to embodiments of the present invention. Trigger type subfield value '8' indicates a Ranging type 205 in the trigger type subfield values.

Figure 3:
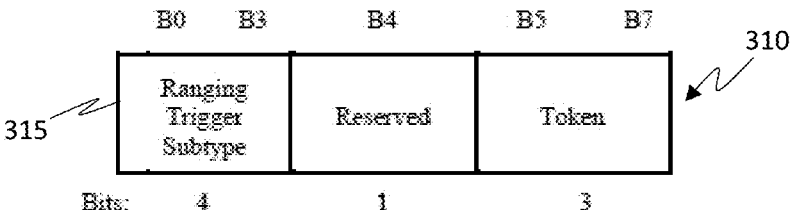
FIG. 3 is a table depicting an exemplary Ranging Trigger Type encoding for an EHT variant Common Info Field identifying Ranging Trigger subtypes according to embodiments of the present invention.

FIG. 3 depicts an exemplary Ranging Trigger Type encoding 305 for an EHT variant Common Info Field 310 identifying Ranging Trigger subtypes according to embodiments of the present invention. The Ranging Trigger Types 305 include: 0: Poll; 1: Sounding; 2 Secure Sounding; 3: Report; and 4: Passive Sounding. The Ranging Trigger Subtype value 315 is typically a 4-bit value.

Figure 4:
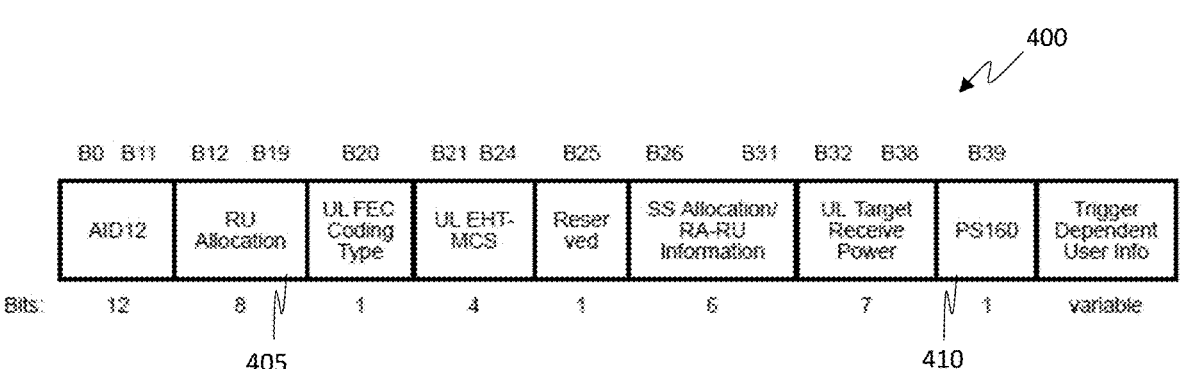
FIG. 4 is a table depicting an exemplary EHT variant User Info Field according to embodiments of the present invention.

FIGS. 4-7 depict exemplary EHT variations of a User Info field of a Trigger Frame for performing wireless ranging using relatively high bandwidths. These figures are similar to FIGS. 9-64lc-e of the IEEE 802.11az specification modified for use with high bandwidth EHT ranging transmissions, according to embodiments. Using the User Info Field EHT subvariants described herein, wireless devices can identify Trigger frames used to signal ranging procedures using higher bandwidths, such as 320 MHz. Specifically, FIG. 4 depicts an exemplary EHT variant User Info Field 400 according to embodiments of the present invention. In User Info Field 400, bits B12-B19 indicate resource unit (RU) allocation information 405, and bit B25 (410) is reserved.

FIG. 5 depicts a Poll and Report EHT subvariant 500 of a User Info Field according to embodiments of the present invention. Poll and Report EHT subvariant 500 is modified so that bit 25 is reserved (505) and PS160 field 510 corresponds to bit B39. Typically the PS160 subfield is used to indicate a 160 MHz segment for 2×996-tone RU, 996+484-tone MRU, and 996+484+242-tone MRU.

Figure 6:
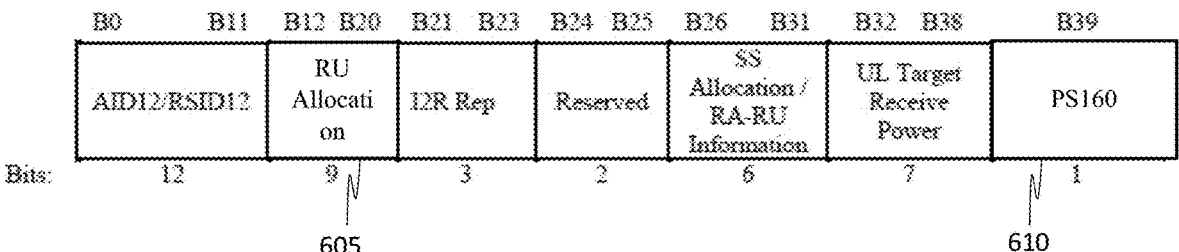
FIG. 6 depicts an exemplary Sounding EHT subvariant of a User Info Field according to embodiments of the present invention.

FIG. 6 depicts an exemplary Sounding EHT subvariant 600 of a User Info Field according to embodiments of the present invention. In the example of FIG. 6, the user info field subvariant is modified so that the RU allocation subfield 605 corresponds to bits B12-B20, and the PS160 subfield 610 corresponds to Bit B39.

FIG. 7 depicts an exemplary Secure Sounding EHT subvariant 700 of a User Info Field according to embodiments of the present invention. Secure Sounding EHT subvariant 700 includes PS160 subfield 705 corresponding to bit B39.

Figure 8:
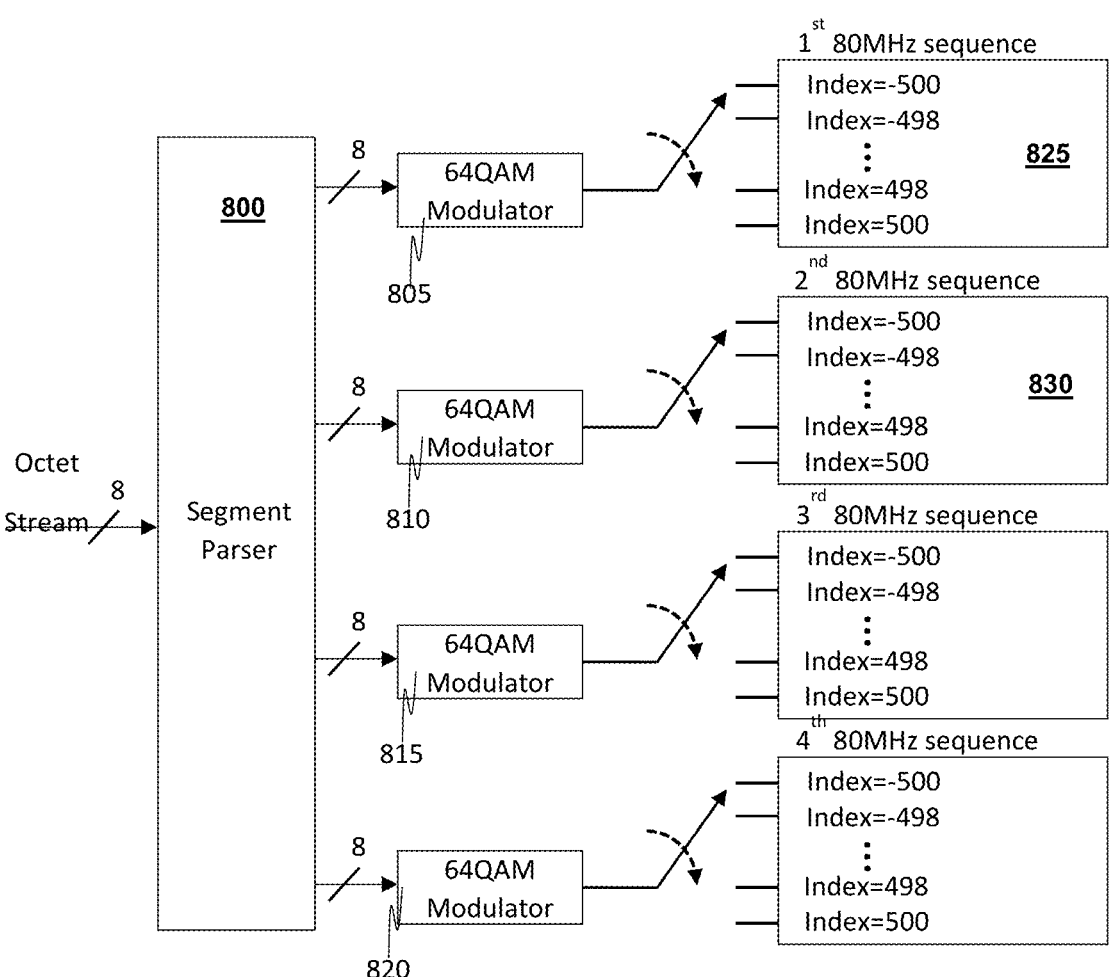
FIG. 8 depicts an exemplary segment parser supporting ranging using high bandwidths such as BW240 and BW320 according to embodiments of the present invention.

FIG. 8 depicts an exemplary segment parser 800 for ranging using high bandwidths such as BW240 and BW320 according to embodiments of the present invention. Parsing is performed in a round robin fashion to divide the pseudo-random octets between the sequences for the 80 MHz segments, working from the lowest frequency to the highest frequency. In the example of FIG. 8, 4-segment parser 800 receives an octet input stream and outputs 4 octet streams, which are inputs to 4 64QAM Modulators 805, 810, 815, and 820. 64QAM Modulators 805 outputs the first 80 MHz sequence 825, 64QAM Modulators 810 outputs the second 80 MHz sequence 830, and so on. According to other embodiments, a 2-segment parser is used to parse the lower 80 MHz portion and the upper 80 MHz portion of a 160 MHz frequency, similar to the approach in IEEE 802.11az.

PHY layer modifications to support EHT based BW320 ranging include new TXVECTOR, RXVECTOR, and LTFVECTOR definitions similar to the IEEE 802.11az specification. Secure Ranging NDP based on EHT frame format with secure EHT-long training fields (LTFs), TB Ranging NDP based on EHT frame format (i.e., EHT TB Ranging NDP), and secure TB Ranging NDP based on EHT frame format with secure EHT-LTFs are supported. For example, similar to the 802.11az Draft 4.1 specification, random LTF sequences can be generated for the EHT BW320 format, secure EHT-LTF for BW320 can be constructed, and pseudorandom and deterministic per-spatial stream phase rotations are supported.

FIG. 9 depicts fields and values of an exemplary Format and Bandwidth subfield 900 carried in a Ranging Parameters field of an Initial Fine Timing Measurement (IFTMR) frame according to embodiments of the present invention. A responding wireless station (RSTA) Assigned Max Bandwidth value defines the maximum allowed bandwidth for measurement exchanges of a wireless ranging procedure. According to some embodiments, values 6-16 (905) are used to indicate BW240 and BW320 ranging (e.g., 6: EHT BW240; and 7: EHT BW320). According to other embodiments, values 6-16 indicate BW320 ranging, and preamble puncture patterns are indicated in a U-SIG field of a Bandwidth field or Punctured Channel Information field for an EHT multi-user (MU) physical layer protocol data unit (PPDUs) using non-OFDMA transmission (see, FIGS. 10, 12, 14A, and 14B).

FIG. 10 depicts exemplary fields and values of a U-SIG field 1000 for an EHT NDP announcement (NDPA) frame or a Ranging NDP frame according to embodiments of the present invention. To facilitate wireless ranging at higher bandwidths and avoid interference, BW320 puncturing patterns are signaled in U-SIG in Bandwidth field, or in a Punctured Channel Information field for EHT MU PPDU using non-OFDMA transmission. Bits B0-B2 (1005) are set to 0 for EHT and bits B3-B5 (1010) are set to 4 for 320 MHz-1 or 5 for 320 MHz-2 to support channelization for 320 MHz channels.

Figure 11:
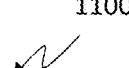
FIG. 11 is a table depicting exemplary preamble puncture patterns for high-bandwidth EHT wireless ranging according to embodiments of the present invention.

FIG. 11 depicts exemplary preamble puncture patterns 1100 for high-bandwidth EHT wireless ranging according to embodiments of the present invention. According to some embodiments, only a limited number of puncturing patterns are supported for a BW320 or BW240 EHT ranging NDP. For example, in the example of FIG. 11, the limited puncturing patterns 1105 supported for EHT high bandwidth wireless ranging include ('x' indicating a punctured portion; and '1' indicating available bandwidth):

(1105)→[1 1 1 1 1 1 1 1] (4×996-tone RU 1): BW320 (continuous)

(1110)→[x x 1 1 1 1 1 1] (3×996-tone MRU 1): BW240-1 (punctured)

(1115)→[1 1 1 1 1 1 x x] (3×996-tone MRU 4): BW240-2 (punctured)

According to other embodiments, supported puncturing patterns are optionally defined in a lookup table (see, FIGS. 14A and 14B), and a limited set of puncturing patterns (e.g., patterns 1105, 1110, and 1115 listed above) are mandatory. For example, according to some embodiments, support for a continuous bandwidth of 320 MHz and some other limited puncturing patterns is mandatory (e.g., puncturing patterns with field value 0, 1, 8, 9, 12, 13, 18, 19, and 24 of Table 36-30), and the other preamble puncturing patterns of Table 36-30 are optionally supported.

FIG. 12 shows fields and values of an exemplary U-SIG field 1200 of an EHT trigger based (TB) PPDU according to embodiments of the present invention. It is not typically possible to signal preamble puncturing patterns in U-SIG in an EHT TB ranging NDP. Therefore, an initiating wireless station (ISTA) can obtain the preamble puncturing pattern from beacon frames. The ISTA applies the preamble puncturing pattern when transmitting EHT TB ranging NDP frames. As depicted in FIG. 12, Bits B0-B2 (1205) are set to 0 for EHT, and bits B3-B5 (1210) are set to 4 for 320 MHz-1 and 5 for 320 MHz-2 to support channelization for 320 MHz channels.

According to some embodiments, an EHT wireless access point (AP) can transmit a trigger frame with an EHT variant or HE variant Common Info field, or a trigger frame with an EHT variant, HE variant, and or other special variant of a User Info field. The Trigger Type subfield of an EHT/HE Common Info field can specify the Ranging Type, and a Ranging Trigger Frame uses its own User Info field format. As described above with regard to FIGS. 4-7, the EHT variant User Info field can be modified to include a Ranging User Info field, and the RU Allocation information can be included in the Ranging User Info field, according to embodiments.

Specifically, for signaling a BW320 TB PPDU using a trigger frame, the Uplink Bandwidth (UL BW) field in a EHT variant Common Info Field or the UL Bandwidth Extension field in a Special User Info field of EHT TF with AID12=2007 are used. For signaling a BW240 TB PPDU using a trigger frame, the RU allocation field in the Ranging User info field of a trigger frame signals the multi-RUs (MRUs) used for TB PPDU for BW240 wireless ranging.

To signal BW320 in a trigger frame with puncturing patterns, the UL BW field in the EHT variant common info field and the UL Bandwidth Extension field in the Special User Info with AID12=2007 are used.

FIG. 13 depicts an exemplary UL Bandwidth Extension subfield encoding 1305 of the Special User Info field 1310 of an EHT TB PPDU according to embodiments of the present invention. The Special User Info field corresponds to an AID12 value of 2007. UL Bandwidth Extension sub-field 1315 indicates the bandwidth in the U-SIG field of the EHT TB PPDU. UL BW is 3 for 320 MHz-1 and 320 MHz-2, with an HE TB PPDU bandwidth of 160 MHz. The UL Bandwidth Extension value for 320 MHz-1 is 2 and the UL Bandwidth Extension value for 320 MHz-2 is 3. Moreover, an RU Allocation subfield in a Ranging User Info field of a trigger frame can signal MRUs used with TB PPDUs for BW240 ranging following the same definitions as the EHT variant User Info field. These values can correspond to the exemplary RU/MRU index depicted in FIGS. 14A and 14B. For example, BW320 can correspond to 4×996 RU1 (no puncturing), and BW240 can correspond to 3×996 MRU (80 MHz puncturing).

FIGS. 14A and 14B depict an exemplary RU/MRU index 1400 for a 320 MHz PPDU using 40 MHz, 80 MHz, and concurrent 80 MHz and 40 MHz puncturing, with the corresponding field value according to embodiments of the present invention. A field value of 0 indicates no puncturing (i.e., continuous 320 MHz). Some of the preamble puncturing patterns depicted in FIGS. 14A and 14B are optionally supported for high bandwidth wireless ranging, according to some embodiments.

Exemplary Computer Controlled System

Figure 15:
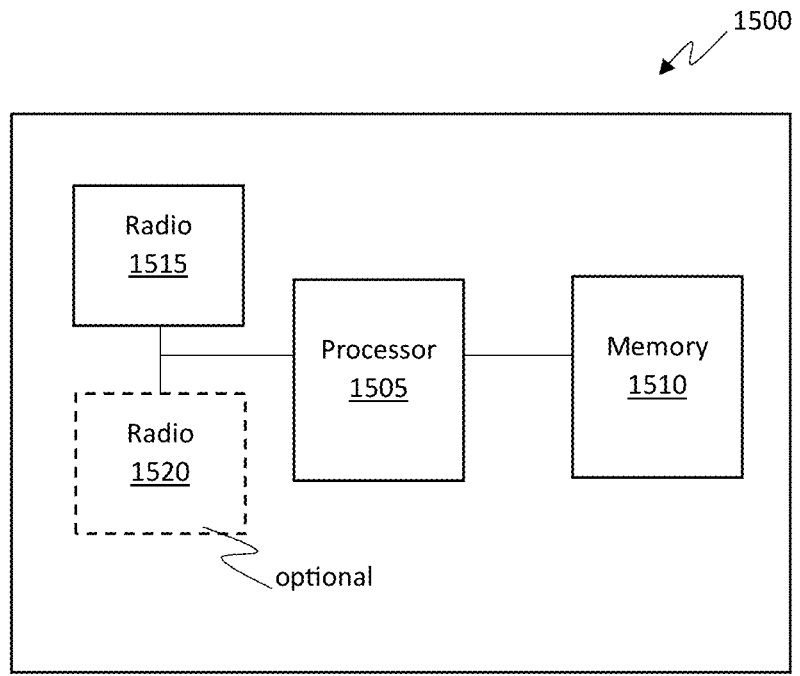
FIG. 15 is a block diagram depicting an exemplary computer system platform upon which embodiments of the present invention may be implemented.

FIG. 15 depicts an exemplary wireless multi-link device 1500 upon which embodiments of the present invention can be implemented. Embodiments of the present invention are drawn to wireless devices capable of transmitting and/or receiving frames (e.g., EHT frames) used to perform wireless ranging using high bandwidths (e.g., 320 MHz or 240 MHz) to improve performance of wireless communications.

Wireless device 1500 includes a processor 1505 for running firmware, software applications, and optionally an operating system. Memory 1510 can include read-only memory and/or random-access memory, for example, to store executable machine code and data (e.g., tables of index values) for use by the processor 1505 and data received or transmitted by one or more radios.

In the example of FIG. 5, Radio 1515 can communicate with other electronic devices over a wireless network (e.g., WLAN) using multiple spatial streams (e.g., multiple antennas) and typically operates according to IEEE standards (e.g., IEEE 802.11ax, IEEE 802.11ay, IEEE 802.11be, etc.). According to some embodiments, multiple radios are included (e.g., radio 1520). One radio can be designated to communicate wirelessly over a primary wireless link while the other radio or radios operate over secondary wireless links or are in a sleep or power-save mode, according to embodiments. The timing of the transmissions of the radio (s) can be configured according to one of the high bandwidth ranging procedures described herein.

Exemplary High-Bandwidth Wireless Ranging Procedure

Figure 16:
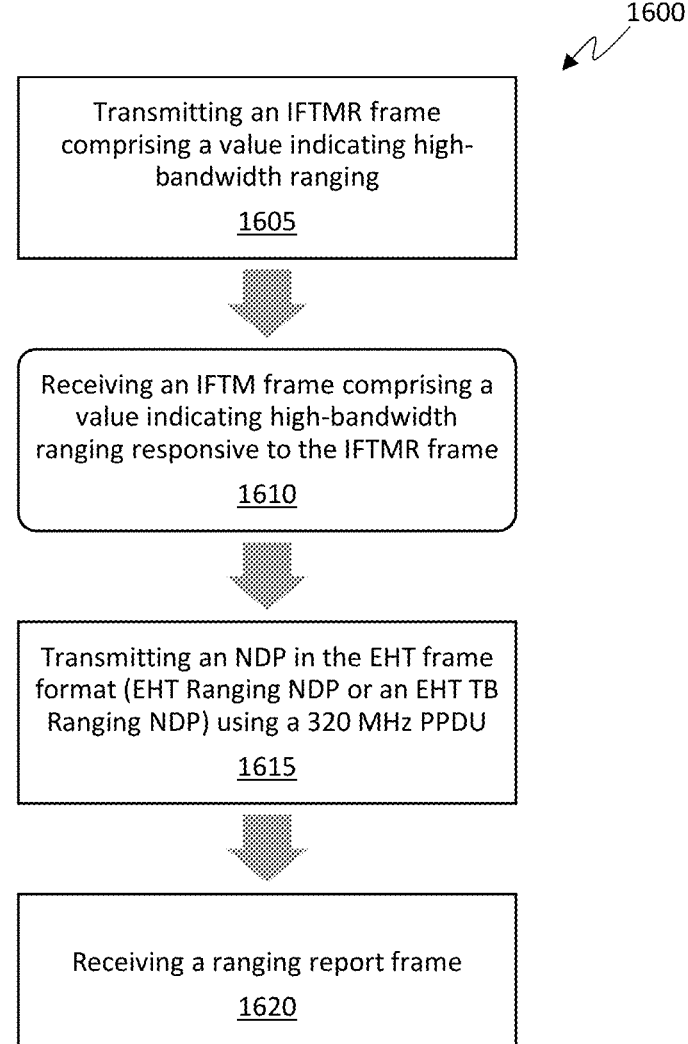
FIG. 16 is a flow chart depicting steps of an exemplary high-bandwidth wireless ranging procedure according to embodiments of the present invention.

FIG. 16 is a flow chart depicting steps of an exemplary high-bandwidth wireless ranging procedure 1600 according to embodiments of the present invention.

At step 1605, an Initial Fine Timing Measurement Request (IFTMR) frame is transmitted to a wireless device to initiate wireless ranging. The IFTMR includes a value indicating high-bandwidth ranging.

At step 1610, an Initial Fine Timing Measurement (IFTM) frame is received from the wireless device responsive to the IFTMR frame transmitted in step 1605. The IFTMR frame and/or the IFTM frame cab include a Format and Bandwidth subfield with a value indicating wireless ranging using EHT BW240 (e.g., 6) or wireless ranging using EHT BW 320 (e.g., 7).

At step 1615 a null data packet (NDP) in the EHT frame format using a 320 MHz PPDU is transmitted to the wireless device. The NDP can be an EHT Ranging NDP or an EHT TB Ranging NDP, for example. According to some embodiments, at least one 80 MHz portion of the 320 MHz PPDU is punctured. According to some embodiments, the NDP comprises an EHT Ranging NDP or an EHT TB Ranging NDP with a U-SIG field operable to signal supported preamble puncturing patterns.

At step 1615, a ranging report is received from the wireless device. The ranging report can include timing information regarding transmission/reception of the EHT NDP or EHT TB NDP transmitted in step 1610 to determine ranging information.

According to some embodiments, wireless ranging procedure 1600 includes transmitting a trigger frame with an EHT variant Common Info field. The EHT variant Common Info field includes a Ranging Trigger subtype set to a value indicating a ranging procedure to the wireless device.

According to some embodiments, wireless ranging procedure 1600 includes generating a random long training field (LTF) sequence in an EHT BW320 format, constructing a secure EHT-long training field (LTF) in an EHT BW320 format, and/or applying pseudorandom and deterministic phase rotations for secure EHT-LTF to spatial streams in an EHT BW320 format.

Embodiments of the present invention are thus described. While the present invention has been described in particular embodiments, it should be appreciated that the present invention should not be construed as limited by such embodiments, but rather construed according to the following claims.

What is claimed is:

1. A method of extremely high throughput (EHT) wireless ranging using a 320 MHz physical layer protocol data unit (PPDU), the method comprising:

transmitting an initial fine timing measurement request (IFTMR) frame comprising an indication high-bandwidth ranging for receipt by a wireless device;

receiving an initial fine timing measurement (IFTM) frame from the wireless device responsive to the IFTMR frame, wherein the IFTM frame comprises a value indicating high-bandwidth ranging; and performing a high-bandwidth wireless ranging procedure comprising:

transmitting a null data packet (NDP) in the EHT frame format using a 320 MHz PPDU for receipt by the wireless device, wherein the NDP comprises at least one of: a ranging NDP; and a trigger-based (TB) ranging NDP; and receiving a ranging report frame from the wireless device.

2. The method of claim 1, wherein the 320 MHz PPDU comprises a continuous 320 MHz bandwidth.

3. The method of claim 1, wherein the 320 MHz PPDU comprises a 240 MHz bandwidth, and wherein a first 80 MHz portion of the 320 MHz PPDU or a last 80 MHz portion of the 320 MHz PPDU is punctured.

4. The method of claim 1, wherein the 320 MHz PPDU comprises a 240 MHz bandwidth, and wherein a last 80 MHz portion of the 320 MHz PPDU is punctured.

5. The method of claim 1, further comprising transmitting a trigger frame (TF) comprising an EHT variant Common Info field, and wherein the EHT variant Common Info field comprises a Ranging Trigger subtype set to a value indicating a ranging procedure to the wireless device.

6. The method of claim 1, wherein the NDP comprises a U-SIG field operable to signal supported preamble puncturing patterns.

7. The method of claim 1, wherein the performing a high-bandwidth wireless ranging procedure further comprises generating a random long training field (LTF) sequence in an EHT BW320 format.

8. The method of claim 1, wherein the performing a high-bandwidth wireless ranging procedure further comprises constructing a secure EHT-long training field (LTF) in an EHT BW320 format.

9. The method of claim 1, wherein the performing a high-bandwidth wireless ranging procedure further comprises applying pseudorandom and deterministic phase rotations for secure EHT-LTF to spatial streams in an EHT BW320 format.

10. The method of claim 1, wherein the performing a high-bandwidth wireless ranging procedure further comprises parsing a data stream using a segment parser coupled to four 64QAM modulators, and wherein each of the four 64QAM modulators are operable to receive pseudorandom octets of the data stream from the segment parser for an 80 MHz portion of a 320 MHz bandwidth in a round robin fashion.

11. The method of claim 1, wherein the NDP comprises a U-SIG field operable to signal supported preamble puncturing patterns, and wherein the IFTM frame and the IFTMR frame comprise a Format and Bandwidth subfield comprising a value indicating wireless ranging using EHT BW320.

12. The method of claim 1, wherein the IFTM frame and the IFTMR frame comprise a Format and Bandwidth subfield comprising a value indicating wireless ranging using at least one of: EHT BW240; and EHT BW 320.

13. The method of claim 12, wherein a value of '6' in the Format and Bandwidth subfield indicates wireless ranging using EHT BW240, and wherein a value of '7' in the Format and Bandwidth subfield indicates wireless ranging using EHT BW320.

14. The method of claim 1, further comprising receiving a beacon frame comprising a plurality of preamble puncturing patterns, and wherein the transmitting the NDP using a 320 MHz PPDU for receipt by a wireless device comprises puncturing a portion of the 320 MHz PPDU according to one of the plurality of preamble puncturing patterns.

15. The method of claim 14, wherein the plurality of preamble puncturing patterns comprise:
mandatory preamble puncture patterns that are supported for performing wireless ranging; and optional preamble puncture patterns that are optionally supported for performing wireless ranging.

16. An apparatus for wireless ranging using an extremely high throughput (EHT) 320 MHz PPDU, the apparatus comprising:
a processor;
a memory coupled to the processor and operable to store data; and
a radio under control of said processor and operable to perform wireless ranging, and wherein the processor is operable to cause the radio to:
transmit an Initial Fine Timing Measurement Request (IFTMR) frame comprising an indication indicating high-bandwidth ranging for receipt by a wireless device;
receive an Initial Fine Timing Measurement (IFTM) frame from the wireless device responsive to the IFTMR frame, wherein the IFTM frame comprising a value indicating high-bandwidth ranging;
transmit a null data packet (NDP) in the EHT frame format using a 320 MHz PPDU for receipt by the wireless device; and
receive a ranging report frame from the wireless device.

17. The apparatus of claim 16, wherein the processor is further operable to cause the radio to transmit a trigger frame (TF) comprising an EHT variant Common Info field.

18. The apparatus of claim 17, wherein the EHT variant Common Info field comprises a Ranging Trigger subtype set to a value indicating a ranging procedure to the wireless device.

19. A non-transitory computer-readable storage medium having embedded therein program instructions, which when executed by one or more processors of a device, causes the device to execute a method for wireless ranging using an extremely high throughput (EHT) 320 MHz PPDU, the method comprising:
transmitting an initial fine timing measurement request (IFTMR) frame comprising an indication indicating high-bandwidth ranging for receipt by a wireless device;
receiving an initial fine timing measurement (IFTM) frame from the wireless device responsive to the IFTMR frame, wherein the IFTM frame comprises a value indicating high-bandwidth ranging;
transmitting a null data packet (NDP) in the EHT frame format using a 320 MHz PPDU for receipt by the wireless device, wherein the NDP comprises at least one of: a ranging NDP; and a trigger-based (TB) ranging NDP; and
receiving a ranging report frame from the wireless device.

20. The non-transitory computer-readable storage medium of claim 19, wherein the method further comprises transmitting a trigger frame (TF) comprising an EHT variant Common Info field, and wherein the EHT variant Common Info field comprises a Ranging Trigger subtype set to a value indicating a ranging procedure to the wireless device.

* * * * *